(12) United States Patent
Lee

(10) Patent No.: US 11,525,600 B2
(45) Date of Patent: Dec. 13, 2022

(54) AIR CONDITIONING SYSTEM AND CONTROL METHOD THEREOF

(71) Applicant: KOREA INSTITUTE OF SCIENCE AND TECHNOLOGY, Seoul (KR)

(72) Inventor: Dae Young Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1153 days.

(21) Appl. No.: 15/195,049

(22) Filed: Jun. 28, 2016

(65) Prior Publication Data

US 2017/0016646 A1    Jan. 19, 2017

(30) Foreign Application Priority Data

Jul. 15, 2015 (KR) .................. 10-2015-0100511

(51) Int. Cl.
*F24F 11/00* (2018.01)
*F24F 12/00* (2006.01)
(Continued)

(52) U.S. Cl.
CPC .......... *F24F 12/006* (2013.01); *F24F 3/1423* (2013.01); *F24F 11/30* (2018.01);
(Continued)

(58) Field of Classification Search
CPC ........ F24F 3/1423; F24F 12/006; F24F 11/30; F24F 2203/1016; F24F 2203/1032; F24F 2203/1084; F24F 2120/20
See application file for complete search history.

(56) References Cited

U.S. PATENT DOCUMENTS 6,099,623 A * 8/2000 Namatame ............ F24F 3/1423
96/125
6,370,900 B1    4/2002 Maeda
(Continued)

FOREIGN PATENT DOCUMENTS

CN    ON 202350250 U    7/2012
CN    ON 104006463 A    8/2014
(Continued)

OTHER PUBLICATIONS

Chinese Office Action dated Oct. 25, 2018 in corresponding Chinese Patent Application No. 201610560016.7 (12 pages in English and 10 pages in Chinese).
(Continued)

*Primary Examiner* — Nael N Babaa
(74) *Attorney, Agent, or Firm* — NSIP Law

(57) ABSTRACT

An air conditioning control system includes a casing including paths through which air passes, dampers arranged at an entrance and an exit of each of the paths and operated to open or close the entrance and the exit according to a control signal, a heat and mass exchanger including a hygroscopic material for absorbing moisture and arranged across the paths to be rotated with respect to the casing, a driving unit rotating the heat and mass exchanger, a heat exchange unit having a heat transfer medium flowing inside the heat exchange unit and arranged on at least one of the paths, and a controller opening or closing the entrance and the exit of the paths by applying a control signal to the dampers, and changing a rotation speed of the heat and mass exchanger by applying a control signal to the driving unit, according to operation modes.

9 Claims, 14 Drawing Sheets

(51) Int. Cl.
*F24F 3/14* (2006.01)
*F24F 11/70* (2018.01)
*F24F 11/30* (2018.01)
*F24F 140/20* (2018.01)
*F24F 110/20* (2018.01)
*F24F 110/50* (2018.01)
*F24F 110/10* (2018.01)
*F24F 120/20* (2018.01)

(52) U.S. Cl.
CPC ........... *F24F 11/70* (2018.01); *F24F 2110/10* (2018.01); *F24F 2110/20* (2018.01); *F24F 2110/50* (2018.01); *F24F 2120/20* (2018.01); *F24F 2140/20* (2018.01); *F24F 2203/1016* (2013.01); *F24F 2203/1032* (2013.01); *F24F 2203/1084* (2013.01); *Y02B 30/56* (2013.01)

(56) References Cited

U.S. PATENT DOCUMENTS

| | | | |
|---|---|---|---|
| 7,690,582 B2 | 4/2010 | Matsui et al. | |
| 2005/0050906 A1* | 3/2005 | Dinnage | F24F 5/001 62/94 |
| 2010/0307175 A1* | 12/2010 | Teige | F24F 3/1423 62/94 |
| 2011/0308265 A1* | 12/2011 | Phannavong | F24F 12/001 62/160 |

FOREIGN PATENT DOCUMENTS

| | | |
|---|---|---|
| JP | 2000-88285 A | 3/2000 |
| JP | 2004-354009 A | 12/2004 |
| JP | 2012-167843 A | 9/2012 |
| JP | 5258619 B2 | 5/2013 |
| JP | 2013155885 A * | 8/2013 |
| KR | 10-2013-0066910 A | 6/2013 |
| KR | 20130066910 A * | 6/2013 |

OTHER PUBLICATIONS

Notice of Allowance dated May 27, 2017 in Korean Patent Application No. 10-2015-0100511 (2 pages in Korean).

Korean Office Action dated Sep. 19, 2016 in counterpart Korean Application No. 10-2015-0100511. (4 pages in Korean).

Korean Office Action dated Mar. 25, 2016 in counterpart Korean Application No. 10-2015-0100511 (4 pages in Korean).

* cited by examiner

AIR CONDITIONING SYSTEM AND CONTROL METHOD THEREOF

CROSS-REFERENCE TO RELATED APPLICATION

This application claims the benefit of Korean Patent Application No. 10-2015-0100511, filed on Jul. 15, 2015, in the Korean Intellectual Property Office, the disclosure of which is incorporated herein in its entirety by reference.

BACKGROUND

1. Field

One or more embodiments relate to an air conditioning system and a control method thereof, and more particularly, to an air conditioning system which may selectively perform various operation modes by performing both functions of a desiccant wheel and an enthalpy exchanger, using a single component, by changing a rotation speed of a heat and mass exchanger, and a control method thereof.

2. Description of the Related Art

An air conditioning system performs a cooling operation or a heating operation by controlling temperature and humidity in a sectioned space or a ventilation operation by discharging indoor air and supplying outdoor air.

The air conditioning system is widely used from a large space such as a large building or a public place to a small space such as an individual work space. Since the air conditioning system generally uses electric power, concurrent usage of the air conditioning system particularly in the summer season results in a sharp increase in the electricity demand which may cause instability in the electricity supply system. Accordingly, there have been efforts to develop alternative technologies to replace the conventional air conditioning system or overcome the shortcoming.

For example, energy recovery ventilation apparatuses are installed in houses or commercial buildings to recover energy from the indoor air being discharged and transfer it to the outdoor intake air for ventilation. In general, an enthalpy exchanger is used to recover heat from the air or to transfer heat to the air in the energy recovery ventilation apparatus.

U.S. Pat. Nos. 6,918,263 and 8,943,848 disclose technologies to add cooling and heating functions to a general ventilation operation function by inserting a heat pump in a ventilation apparatus. In U.S. Pat. No. 6,918,263, a desiccant wheel is inserted in the ventilation apparatus to add a dehumidifying operation function. However, since additional parts are needed, the structure of an overall system is complicated and manufacturing costs are increased.

The enthalpy exchanger is used to recover energy from the air and the desiccant wheel is used to remove moisture from the air. Since both enthalpy exchanger and desiccant wheel transfer heat and moisture from air to air, they belong to air-to-air exchangers. In general, the air-to-air exchanger is quite larger in volume than a liquid-to-liquid exchanger for exchanging energy between liquid and liquid or a liquid-to-air exchanger for exchanging energy between liquid and air. Accordingly, it is not desirable to adopt both components of the enthalpy exchanger and the desiccant wheel in a single air conditioning system because the system would be too bulky.

Korean Patent No. 1061944 discloses a ventilation apparatus technology in which a desiccant wheel and a heat pump are used without installation of an enthalpy exchanger. However, according to the technology, the recovery of ventilation energy during a ventilation operation may not be performed.

In addition, a demand for comfortable indoor air in houses and public buildings and at industrial sites has continuously increased. To this end, a dehumidifier is applied in the summer season and a humidifier aside from the dehumidifier is applied in the winter season. For customers, it is quite inconvenient to purchase, install, and maintain multiple apparatuses, each having only a single function.

SUMMARY

One or more embodiments include an air conditioning system which may selectively perform various operation modes such as a dehumidification mode, a humidification mode, an energy recovery ventilation mode, a ventilation cooling mode, and a ventilation heating mode, and a control method thereof.

One or more embodiments include an air conditioning system which may perform various operation modes with a simple and compact structure by using a minimum number of elements such as a heat and mass exchanger and a heat exchange unit, and a controlling method thereof.

One or more embodiments include an air conditioning system which may perform both functions of a desiccant wheel and an enthalpy exchanger by using a single heat and mass exchanger including hygroscopic material for absorbing moisture. The alternation of functions may be performed by changing a rotation speed of the heat and mass exchanger.

One or more embodiments include an air conditioning system which may include a heat and mass exchanger and a heat exchange unit (elements of a heat pump) and thus efficiency of the heat pump is improved through the operation of the heat and mass exchanger.

One or more embodiments include an air conditioning system which may improve energy efficiency of operation modes such as a ventilation cooling mode and a ventilation heating mode performed by a heat and mass exchanger, by changing the installation position with respect to the heat and mass exchanger and the number of the heat exchange units comprising the heat pump.

Additional aspects will be set forth in part in the description which follows and, in part, will be apparent from the description, or may be learned by practice of the presented embodiments.

According to one or more embodiments, an air conditioning control system includes a casing including a plurality of paths through which air passes, a plurality of dampers arranged at an entrance and an exit of each of the plurality of paths and operated to open or close the entrance and the exit according to a control signal, a heat and mass exchanger including a hygroscopic material for absorbing moisture and arranged across the plurality of paths to be rotated with respect to the casing, a driving unit rotating the heat and mass exchanger, a heat exchange unit including a heat transfer medium flowing inside the heat exchange unit and arranged on at least one of the plurality of paths, and a controller opening or closing the entrance and the exit of the plurality of paths by applying a control signal to the plurality of dampers, and changing a rotation speed of the heat and mass exchanger by applying a control signal to the driving unit, according to a plurality of operation modes.

The plurality of paths of the casing may include a first path and a second path.

The plurality of dampers may include a plurality of outlet dampers connecting the exits of the first path and the second path to an outdoor discharge path or an indoor supply path, and a plurality of inlet dampers connecting the entrances of the first path and the second path to an outdoor intake path or an indoor return path.

The heat exchange unit may include an evaporator arranged at an upstream side of the heat and mass exchanger in the first path, and a condenser arranged at an upstream side of the heat and mass exchanger in the second path.

The controller may selectively perform one of a dehumidification mode of supplying dehumidified air to indoor by passing indoor return air through the first path and discharging humidified air to outdoor by passing outdoor intake air through the second path, by controlling a rotation speed of the heat and mass exchanger to a low speed in a preset low speed range, and an energy recovery ventilation mode of discharging the indoor return air, from which heat and moisture are recovered by the heat and mass exchanger, to the outdoor by passing the indoor return air through the second path and supplying the air heated and humidified with the heat and moisture retrieved from the heat and mass exchanger to the indoor by passing the outdoor intake air through the first path, by controlling the rotation speed of the heat and mass exchanger to a high speed in a preset high speed range.

The heat and mass exchanger may rotate in a range of about 0.1 to 1 rpm in the dehumidification mode and in a range of about 2 rpm or higher in the energy recovery ventilation mode.

The evaporator and the condenser may be operated in the dehumidification mode, and the evaporator and the condenser may stop operating in the energy recovery ventilation mode.

The heat exchange unit may further include a downstream evaporator arranged at a downstream side of the heat and mass exchanger in the first path.

The controller may selectively perform one of a dehumidification mode of supplying dehumidified air to indoor by passing indoor return air through the first path and discharging humidified air to outdoor by passing outdoor intake air through the second path, by controlling a rotation speed of the heat and mass exchanger to a low speed in a preset low speed range, a humidification mode of discharging dehumidified air to the outdoor by passing the outdoor intake air through the first path and supplying humidified air to the indoor by passing the indoor return air through the second path, by controlling the rotation speed of the heat and mass exchanger to a low speed in a preset low speed range, and an energy recovery ventilation mode of discharging the indoor return air, from which heat and moisture are recovered by the heat and mass exchanger, to the outdoor by passing the indoor return air through the second path and supplying air, which is heated and humidified with the heat and moisture retrieved from the heat and mass exchanger, to the indoor by passing the outdoor intake air through the first path, by controlling the rotation speed of the heat and mass exchanger to a high speed in a preset high speed range.

The heat and mass exchanger may rotate in a range of about 0.1 to 1 rpm in the dehumidification mode and the humidification mode and in a range of about 2 rpm or higher in the energy recovery ventilation mode.

The evaporator and the condenser may be operated and the downstream evaporator may stop operating in the dehumidification mode, the evaporator may stop operating and the condenser and the downstream evaporator are operated in the humidification mode, and the evaporator, the condenser, and the downstream evaporator may stop operating in the energy recovery ventilation mode.

The heat exchange unit may further include a downstream condenser arranged at a downstream side of the heat and mass exchanger in the second path.

The controller may selectively perform one of a dehumidification mode of supplying dehumidified air to indoor by passing indoor return air through the first path and discharging humidified air to outdoor by passing outdoor intake air through the second path, by controlling a rotation speed of the heat and mass exchanger to a low speed in a preset low speed range, a humidification mode of discharging dehumidified air to the outdoor by passing the outdoor intake air through the first path and supplying humidified air to the indoor by passing the indoor return air through the second path, by controlling the rotation speed of the heat and mass exchanger to a low speed in a preset low speed range, an energy recovery ventilation mode of discharging the indoor return air, from which heat and moisture are recovered by the heat and mass exchanger, to the outdoor by passing the indoor return air through the second path and supplying air, which is heated and humidified with the heat and moisture retrieved from the heat and mass exchanger, to the indoor by passing the outdoor intake air through the first path, by controlling the rotation speed of the heat and mass exchanger to a high speed in a preset high speed range, a ventilation cooling mode of discharging the indoor return air, which is heated by the heat and mass exchanger, to the outdoor by passing the indoor return air through the second path and supplying the outdoor intake air, which is cooled by the heat and mass exchanger, to the indoor by passing the outdoor intake air through the first path, by controlling rotation speed of the heat and mass exchanger to a high speed in a preset range, and a ventilation heating mode of supplying the outdoor intake air, which is heated by the heat and mass exchanger, to the indoor by passing the outdoor intake air through the second path and discharging the indoor return air, which is cooled by the heat and mass exchanger, to the outdoor by passing the indoor return air through the first path, by controlling rotation speed of the heat and mass exchanger to a high speed in a preset high speed range.

The heat and mass exchanger may rotate in a range of about 0.1 to 1 rpm in the dehumidification mode and the humidification mode, in a range of about 2 rpm or higher in the energy recovery ventilation mode, the ventilation cooling mode, and the ventilation heating mode.

The evaporator and the condenser may be operated and the downstream evaporator and the downstream condenser may stop operating in the dehumidification mode, the evaporator and the downstream condenser may stop operating and the condenser and the downstream evaporator may be operated in the humidification mode, the evaporator, the condenser, the downstream evaporator, and the downstream condenser may stop operating in the energy recovery ventilation mode, and the evaporator and the condenser may stop operating and the downstream evaporator and the downstream condenser may be operated in the ventilation cooling mode and the ventilation heating mode.

According to one or more embodiments, a method of controlling an air conditioning system includes setting an operation mode of the air conditioning system, controlling operations of a plurality of dampers arranged at entrances and exits of a plurality of paths formed in a casing and through which air passes, to open or close the entrances and the exits according to a set operation mode, setting an operation of a heat exchange unit according to the set operation mode, the heat exchange unit having a heat transfer medium flowing inside the heat exchange unit and arranged in at least one of the plurality of paths, and setting a rotation speed of a heat and mass exchanger according to the set operation mode, the heat and mass exchanger a hygroscopic material for absorbing moisture and arranged across the plurality of paths to be rotated with respect to the casing.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
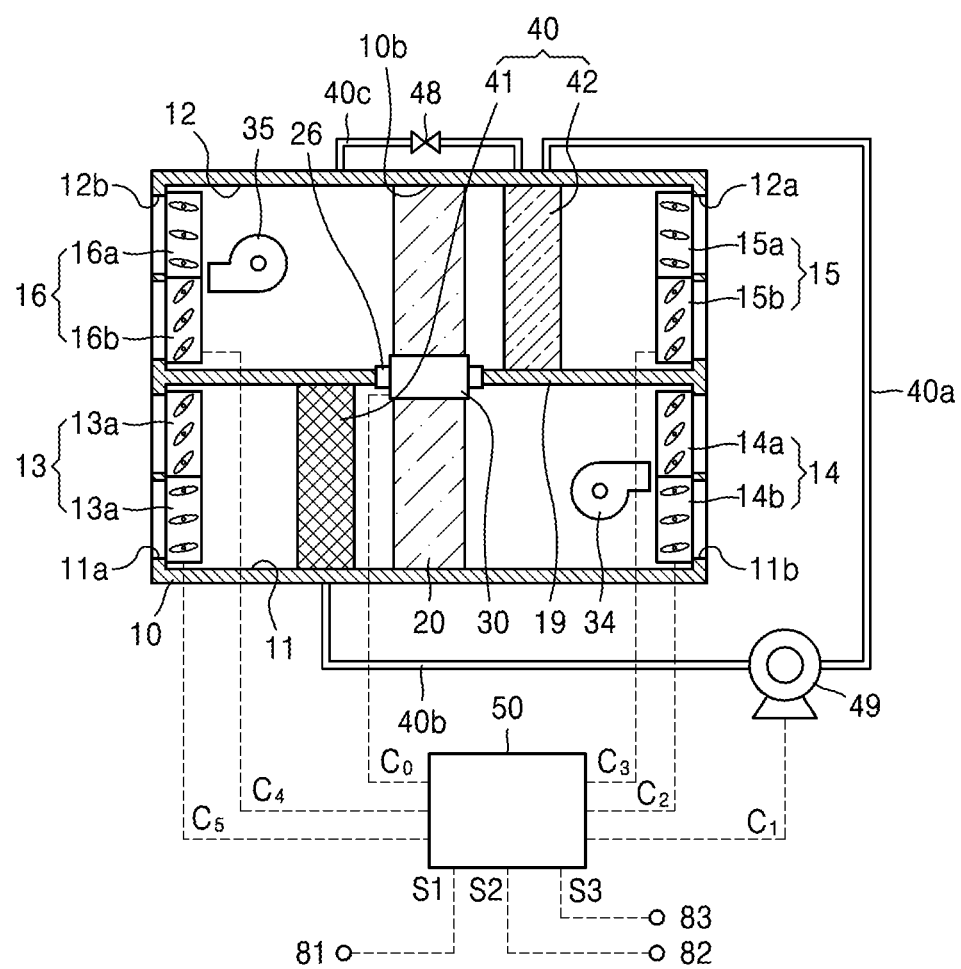
FIG. 1 is a conceptual diagram schematically illustrating a connection relation of elements of an air conditioning system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, the structure and operation of air conditioning systems according to embodiments, and a controlling method thereof, are described in detail with reference to the accompanying drawings.

FIG. 1 is a conceptual diagram schematically illustrating a connection relation of elements of an air conditioning system according to an embodiment.

Referring to FIG. 1, the air conditioning system according to the present embodiment may include a casing 10 including a first path 11 and a second path 12, which are a plurality of paths through which air passes, a plurality of dampers 13, 14, 15, and 16 for opening or closing entrances 11*a* and 12*a* and exits 11*b* and 12*b* of the first path 11 and the second path 12, a heat and mass exchanger 20 rotatably arranged with respect to the casing 10, a driving unit 30 rotating the heat and mass exchanger 20, a heat exchange unit 40 arranged on at least one of the paths, a controller 50 changing a rotation speed of the heat and mass exchanger 20 or controlling operations of the dampers 13, 14, 15, and 16.

The casing 10 is empty inside and has a rectangular or circular sectional shape. The first path 11 and the second path 12, through which the air passes, are substantially parallelly arranged in the casing 10. In FIG. 1, the first path 11 and the second path 12 are separated by a partition 19 extending in a horizontal direction along the inside of the casing 10.

Although FIG. 1 illustrates that the first path 11 and the second path 12 are formed one each in the casing 10, the present disclosure is not limited thereto. For example, each of the first path 11 and the second path 12 may be formed in a plural number in the casing 10.

The first path 11 may include the entrance 11*a* and the exit 11*b*, which are respectively formed at the left and right sides in FIG. 1. Also, the second path 12 may include the entrance 12*a* and the exit 12*b*, which are respectively formed at the right and left sides in FIG. 1.

Although FIG. 1 illustrates that the entrances 11*a* and 12*a* and the exits 11*b* and 12*b* of the first path 11 and the second path 12 are arranged opposite to each other in the left and right direction, the present disclosure is not limited thereto and may be modified in various ways. For example, in FIG. 1, both of the entrance 11*a* of the first path 11 and the entrance 12*a* of the second path 12 may be arranged at the left side, and both of the exit 11*b* of the first path 11 and the exit 12*b* of the second path 12 may be arranged at the right side.

The entrances 11*a* and 12*a* and the exits 11*b* and 12*b* of the first path 11 and the second path 12 may respectively include the dampers 13, 14, 15, and 16 that are operated by control signals to open and close the entrances 11*a* and 12*a* and the exits 11*b* and 12*b*.

The damper 14 arranged at the exit 11*b* of the first path 11 may include an outlet damper 14*a* connecting the exit 11*b* of the first path 11 to an outdoor discharge path and an outlet damper 14*b* connecting the exit 11*b* of the first path 11 to an indoor supply path.

The damper 16 arranged at the exit 12*b* of the second path 12 may include an outlet damper 16*a* connecting the exit 12*b* of the second path 12 to the outdoor discharge path and an outlet damper 16*b* connecting the exit 12*b* of the second path 12 to the indoor supply path.

The outdoor discharge path is a path through which the air discharged from the exits 11b and 12b of the first path 11 and the second path 12 is transferred to the outdoor. The indoor supply path is a path through which the air discharged from the exits 11b and 12b of the first path 11 and the second path 12 are transferred to the indoor.

The damper 13 arranged at the entrance 11a of the first path 11 may include an inlet damper 13a connecting the entrance 11a of the first path 11 to an outdoor intake path and an inlet damper 13b connecting the entrance 11a of the first path 11 to an indoor return path.

The damper 15 arranged at the entrance 12a of the second path 12 may include an inlet damper 15a connecting the entrance 12a of the second path 12 to the outdoor intake path and an inlet damper 15b connecting the entrance 12a of the second path 12 to the indoor return path.

The indoor return path is a path through which the indoor return air is transferred to the entrances 11a and 12a of the first path 11 and the second path 12. The outdoor intake path is a path through which the outdoor intake air is transferred to the entrances 11a and 12a of the first path 11 and the second path 12.

Although FIG. 1 does not illustrate that the indoor return path and the outdoor intake path, and the indoor supply path and the outdoor discharge path, are not illustrated for simplicity's sake, the indoor return path and the outdoor intake path, and the indoor supply path and the outdoor discharge path, are illustrated by using arrows in FIGS. 4, 6, 8, 10, and 12.

The heat and mass exchanger 20 may be arranged inside the casing 10 to be capable of rotating in a direction crossing the first path 11 and the second path 12, that is, in a vertical direction in FIG. 1. As the heat and mass exchanger 20 rotates with respect to the casing 10, the air passing through the first path 11 and the second path 12 contacts the heat and mass exchanger 20 so that an operation of exchanging moisture and heat may be performed between the air and the heat and mass exchanger 20.

The heat and mass exchanger 20 may include a hygroscopic material capable of absorbing moisture. For example, the heat and mass exchanger 20 may be manufactured by using silica gel or a porous polymer dehumidification material. The polymer dehumidification material has a hygroscopic performance about four times higher than that of silica gel and may reduce the weight of the heat and mass exchanger 20 to about one fourth. Accordingly, the polymer dehumidification material is suitable for implementing the heat and mass exchanger 20 that rotates at a high speed.

An outer edge of the heat and mass exchanger 20 may have a circular disc shape or a cylindrical shape. The outer edge of the heat and mass exchanger 20 may be rotatably supported by an inner wall 10b of the casing 10. Accordingly, the inner wall 10b of the casing 10 supporting the outer edge of the heat and mass exchanger 20 may have a circular section.

The heat and mass exchanger 20 may be arranged at the partition 19 to be capable of rotating on a rotation shaft 26. The driving unit 30 may rotate the rotation shaft 26 and the heat and mass exchanger 20.

Although FIG. 1 illustrates that the driving unit 30 is directly coupled to the rotation shaft 26, the present disclosure is not limited to the above embodiment of the driving unit 30. For example, a driving unit for driving a drive gear that is engaged with a gear formed on an outer circumferential surface of the heat and mass exchanger 20, through an outer wall of the casing 10 formed by cutting a portion of the outer wall of the casing 10, may be provided.

The heat exchange unit 40 is arranged in the first and second paths 11 and 12. The heat exchange unit 40 may include an evaporator 41 and a condenser 42 therein, through which a heat transfer medium for heat exchange flows. The evaporator 41 is positioned, in the first path 11, at an upstream side of the heat and mass exchanger 20, that is, at a position close to the entrance 11a. The condenser 42 is positioned, in the second path 12, at an upstream side of the heat and mass exchanger 20, that is, at a position close to the entrance 12a.

The evaporator 41 and the condenser 42 respectively arranged in the first path 11 and the second path 12 are an example of a heat pump connected to an air conditioning system. The heat pump connected to the air conditioning control system in FIG. 1 may include the evaporator 41, the condenser 42, a compressor 49, an expansion valve 48, and coolant pipes 40a, 40b, and 40c connecting the elements of the heat pump and transferring a coolant.

In FIG. 1, while the evaporator 41 and the condenser 42 of the elements of the heat pump are arranged inside the casing 10, the expansion valve 48 and the compressor 49 are arranged outside the casing 10. However, the structure of the heat pump connected to the air conditioning system is not limited to the example shown in FIG. 1 and the number or type of the elements of the heat pump arranged inside the casing 10 may be modified.

For example, only any one of the evaporator 41 and the condenser 42 may be arranged outside the casing 10 according to an operation mode to be implemented by the air conditioning control system, or the number of position of the evaporator 41 and the condenser 42 arranged inside the casing 10 may be modified.

Also, the heat pump may control the operations of the evaporator 41 and the condenser 42 in response to electric signals applied by the controller 50. For example, the heat pump may include a bypass valve and a bypass pipe connected to each of the evaporator 41 and the condenser 42. When the controller 50 applies an electric signal to the bypass valve, the bypass valve is operated to change a flow of the coolant passing through the evaporator 41 or the condenser 42 to the bypass pipe, thereby stopping a heat exchange operation of the evaporator 41 or the condenser 42.

The controller 50 controls the operations of the dampers 13, 14, 15, and 16 by applying control signals C2, C3, C4, and C5 to the dampers 13, 14, 15, and 16 according to operation modes of the air conditioning system, thereby opening or closing the entrances 11a and 12a and the exits 11b and 12b of the first path 11 and the second path 12, or adjusting a degree of opening thereof.

Also, the controller 50 may change the rotation speed of the heat and mass exchanger 20 by applying a control signal C0 to the driving unit 30.

Also, the controller 50 may control the operation of the heat pump by applying a control signal C1 to the compressor 49 of the heat pump.

Also, the controller 50 may be electrically connected to sensors 81, 82, and 83 and receive signals S1, S2, and S3 of the sensors 81, 82, and 83. The sensors 81, 82, and 83 may perform functions of, for example, measuring an indoor temperature, an indoor humidity, a temperature of the coolant passing through the coolant pipes 40a, 40b, and 40c of the heat pump, or a degree of indoor air contamination.

Blowers 34 and 35 for generating flow of air in the first path 11 and the second path 12 may be respectively arranged in the first path 11 and the second path 12. The blowers 34 and 35 may change an amount of air blow according to a control signal applied by the controller 50.

Figure 2:
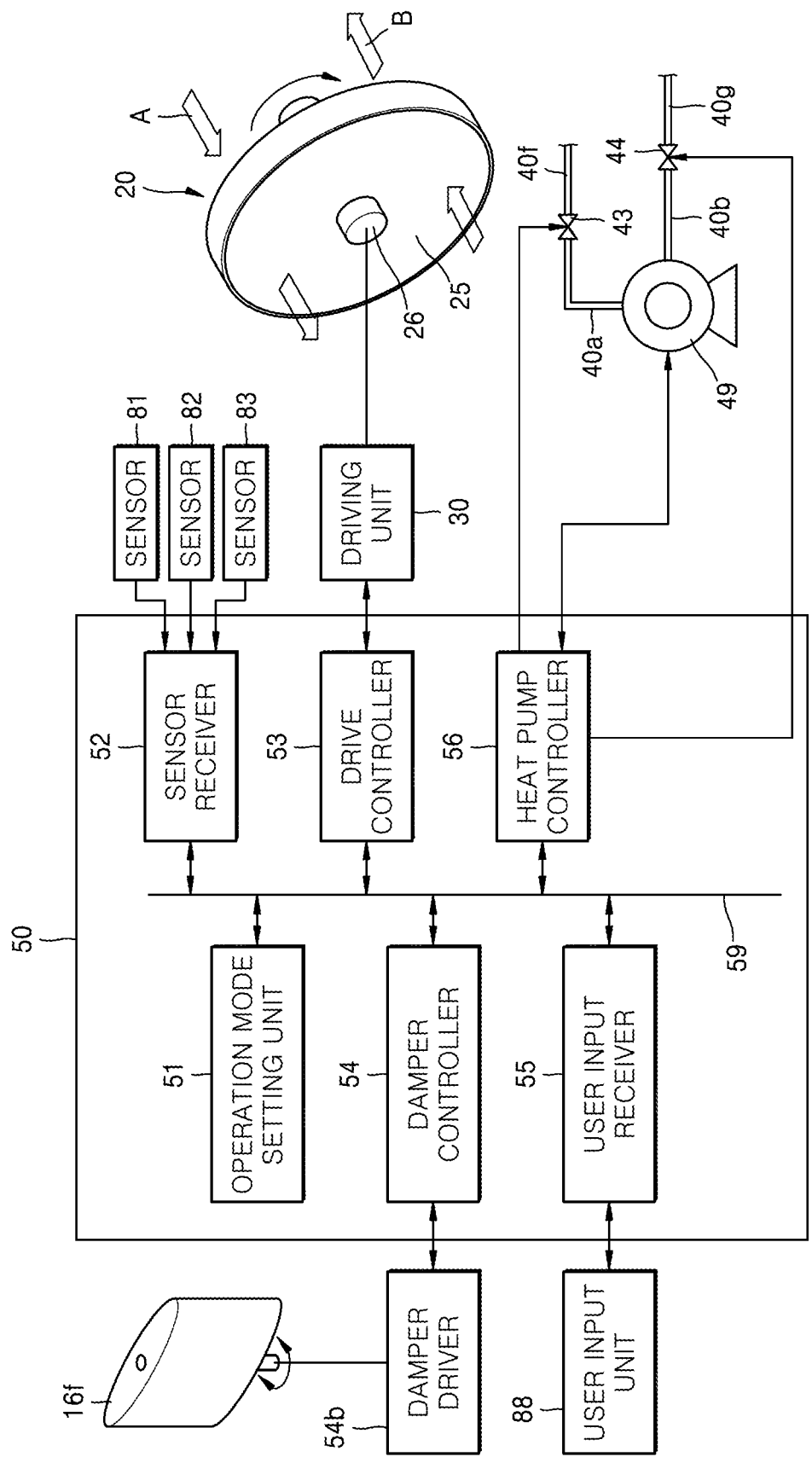
FIG. 2 is a block diagram of a connection relation between a controller and the elements of the air conditioning system of FIG. 1.

FIG. 2 is a block diagram of a connection relation between the controller 50 and the elements of the air conditioning system of FIG. 1.

The controller 50 is electrically connected to the driving unit 30 and the sensors 81, 82, and 83 of the air conditioning system of FIG. 1. The controller 50 may include a sensor receiver 52 receiving signals of the sensors 81, 82, and 83 and a drive controller 53 applying a control signal to the driving unit 30 that rotates the rotation shaft 26 of the heat and mass exchanger 20.

Although not illustrated in FIG. 1, referring to FIG. 2, the air conditioning system may include a damper driving unit 54*b* driving a damper 16*f* and a user input unit 88 receiving an input of a user and generating a signal.

The damper driving unit 54*b* may be implemented by an electric motor operated by an electric signal. The entrances 11*a* and 12*a* and the exits 11*b* and 12*b* of the first path 11 and the second path 12 of FIG. 1 may be open or closed, or a degree of opening thereof may be adjusted, by rotating the damper 16*f*.

The user input unit 88 performs a function of selecting an operation mode to operate the air conditioning system. For example, the user input unit 88 may be implemented by a remote controller connected to the controller 50 by a wireless communication using an infrared signal, or wired communication.

The controller 50 may include a damper controller 54 for controlling the damper driving unit 54*b* and a user input receiver 55 for receiving g an input signal of a user transferred from the user input unit 88.

The controller 50 may include an operation mode setting unit 51. The operation mode setting unit 51 is electrically connected to the respective elements of the controller 50 via a data bus 59 and may set an operation mode of the air conditioning system based on a user input signal received by the user input unit 88 or set an operation mode based on a sensor signal received by the sensor receiver 52.

The controller 50 may include a heat pump controller 56 that applies a control signal to the element such as the compressor 49 of the heat pump or bypass valves 43 and 44. For example, when a control signal is applied from the heat pump controller 56 to the bypass valves 43 and 44, the bypass valves 43 and 44 are operated and thus the coolant of the coolant pipes 40*a* and 40*b* connected to the evaporator 41 and the condenser 42 of FIG. 1 is bypassed toward bypass paths 40*f* and 40*g*, thereby controlling the operations of the evaporator 41 and the condenser 42.

The controller 50 may be implemented by a computer, a control board including a semiconductor chip and a circuit board, or a semiconductor chip including software. Also, the respective elements of the controller 50 may be implemented by a separate control board or software including in a computer, a control board, or a semiconductor chip.

As described above, as a control signal is applied from the drive controller 53 of the controller 50 to the driving unit 30, the rotation speed of the heat and mass exchanger 20 may be changed. As the rotation speed of the heat and mass exchanger 20 is changed, properties of a physical phenomenon generated between air A and B passing through a porous portion 25 of the heat and mass exchanger 20 including a porous hygroscopic material and the heat and mass exchanger 20 may be changed.

Figure 3:
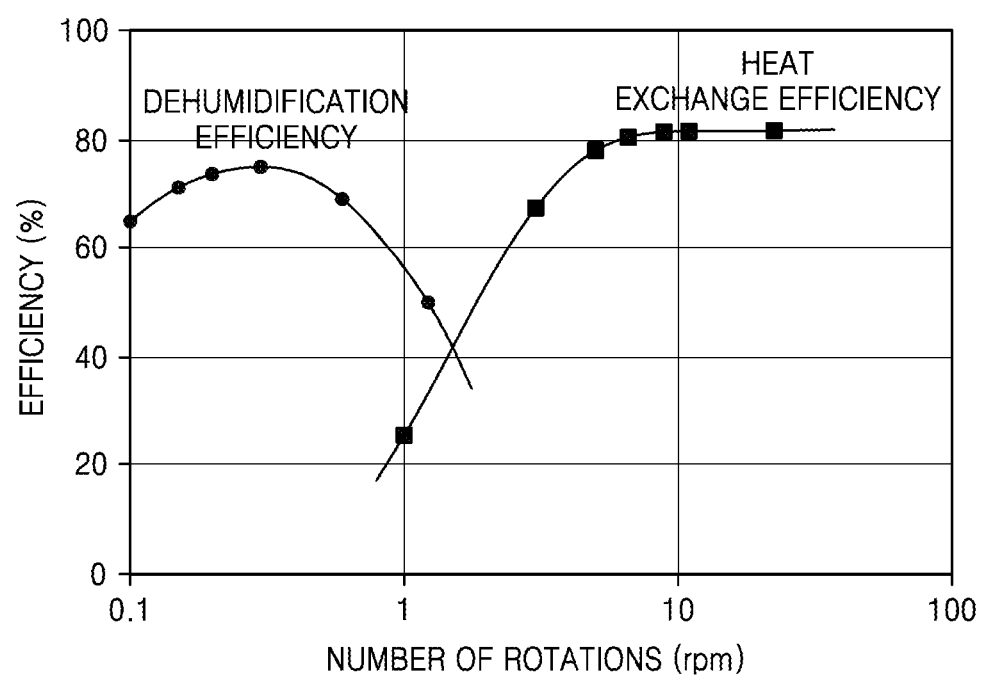
FIG. 3 is a graph of changes in dehumidification efficiency and enthalpy heat exchange efficiency with respect to a change in the rotation number of a heat and mass exchanger of the air conditioning system of FIG. 1.

FIG. 3 is a graph of changes in dehumidification efficiency and enthalpy heat exchange efficiency with respect to a change in the rotation number of the heat and mass exchanger 20 of the air conditioning system of FIG. 1.

In FIG. 3, referring to a left graph indicating dehumidification efficiency of the heat and mass exchanger 20, the dehumidification efficiency becomes the maximum when the rotation speed of the heat and mass exchanger 20 is about 0.1 to 1 rpm. In other words, when the heat and mass exchanger 20 rotates at a low speed of about 0.1 to 1 rpm, moisture is mainly transferred between the heat and mass exchanger 20 and the air and thus the heat and mass exchanger 20 may perform a function of a desiccant wheel. When the heat and mass exchanger 20 functions as the desiccant wheel, the heat and mass exchanger 20 mainly performs a function of removing moisture from the air or transferring moisture to the air.

In FIG. 3, referring to a right graph indicating enthalpy heat exchange efficiency of the heat and mass exchanger 20, the enthalpy heat exchange efficiency becomes maximum in a range in which the rotation speed of the heat and mass exchanger 20 exceeds about 2 rpm. In other words, when the heat and mass exchanger 20 rotates at a high speed exceeding about 2 rpm, heat capacity exchanged between the heat and mass exchanger 20 and an amount of the air increases, the heat and mass exchanger 20 may perform a function of an enthalpy exchanger. When the heat and mass exchanger 20 performs the function of an enthalpy exchanger, the heat and mass exchanger 20 effectively performs a function of transferring heat to the air or absorbing heat from the air.

In a related art, the desiccant wheel is used to implement a dehumidification mode to remove moisture from the air, and the enthalpy exchanger capable of performing heat and mass exchange with the air is used to implement an energy recovery ventilation mode to recover energy in the ventilation between the indoor discharge air and the outdoor intake air.

In the case of the desiccant wheel, the heat and mass exchanger is manufactured by using a material having a small heat capacity and a high hygroscopic capacity to realize superior dehumidification efficiency. Also, in the case of the enthalpy exchanger, the heat and mass exchanger is manufactured by using a material having high heat capacity and high hygroscopic capacity to realize superior enthalpy heat exchange efficiency. Thus, it is impossible to manufacture a single apparatus capable of performing both functions of the desiccant wheel and the enthalpy exchanger.

In the air conditioning system according to the above-described embodiment, both functions of the desiccant wheel and the enthalpy exchanger may be performed by changing the rotation speed of the heat and mass exchanger 20. In the air conditioning system, various operation modes such as an energy recovery ventilation mode, a cooling mode, a heating mode, a dehumidification mode, and a humidification mode may be selected in combination and performed by changing the rotation speed of the heat and mass exchanger 20.

Figure 4:
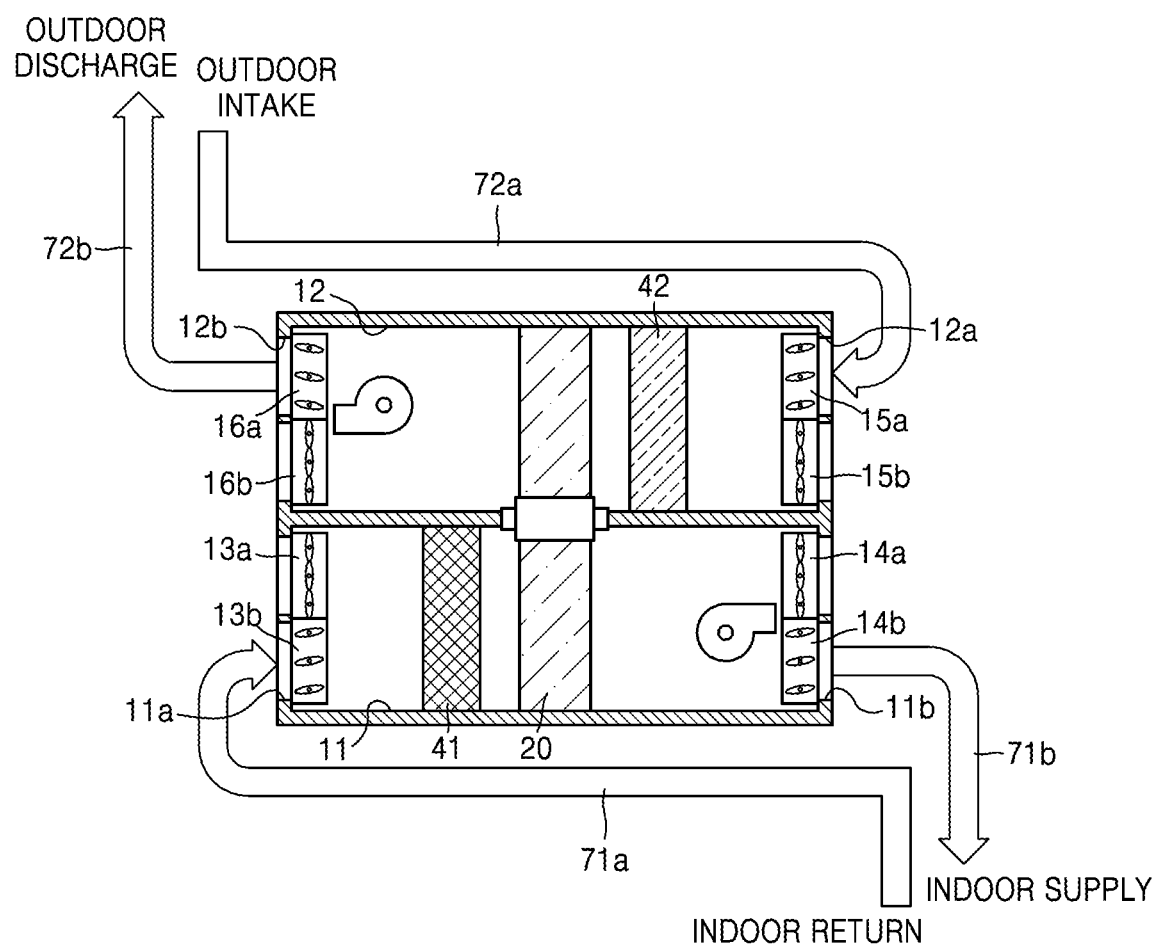
FIG. 4 illustrates an example in which the air conditioning system of FIG. 1 performs a dehumidification mode.

FIG. 4 illustrates an example in which the air conditioning system of FIG. 1 performs a dehumidification mode. In FIG. 4, some elements of FIG. 1 are not illustrated for simplicity's sake.

In FIG. 4, an indoor return path 71*a* for transferring indoor return air to the first path 11 is connected to the inlet damper 13*b* arranged at the entrance 11*a* of the first path 11, and an indoor supply path 71*b* for transferring the air of the first path 11 is connected to the outlet damper 14*b* arranged at the exit 11*b* of the first path 11.

The indoor return air is transferred to the first path 11 through the indoor return path 71*a*. The indoor return air drawn into the first path 11 is dehumidified by passing through the evaporator 41 and the heat and mass exchanger 20 and is resupplied to the indoor through the indoor supply path 71b (indoor supply air).

Also, an outdoor intake path 72a for transferring the air drawn from the outdoor to the second path 12 is connected to the inlet damper 15a arranged at the entrance 12a of the second path 12, and an outdoor discharge path 72b for discharging the air to the outdoor is connected to the outlet damper 16a arranged at the exit 12b of the second path 12.

The outdoor intake drawn into the second path 12 through the outdoor intake path 72a is humidified by passing through the condenser 42 and the heat and mass exchanger 20 and then discharged to the outdoor through the outdoor discharge path 72b (outdoor discharge).

The indoor return path 71a or the outdoor intake path 72a is connected to the other inlet dampers 13a and 15b of FIG. 4, and the outdoor discharge path 72b or the indoor supply path 71b is connected to the other outlet dampers 14a and 16b. However, the other inlet dampers 13a and 15b and the other outlet dampers 14a and 16b are operated at a closing position and thus a flow of air with respect to the paths is interrupted. In FIG. 4, illustration of paths in which a flow of air is interrupted is omitted in order to mainly describe an actual flow of air.

In the dehumidification mode of FIG. 4, a dehumidification operation is performed on the air passing through the first path 11 and a humidification operation is performed on the air passing through the second path 12. During the dehumidification mode, the heat and mass exchanger 20 performs functions of dehumidifying the air in the first path 11 and humidifying the air in the second path 12.

To perform the dehumidification mode of FIG. 4, the air conditioning system rotates the heat and mass exchanger 20 at a speed (low speed) corresponding to a speed equal to or less than a preset low speed value. For example, when the heat and mass exchanger 20 rotates at a low speed in a range of about 0.1 to 1 rpm, the heat and mass exchanger 20 may easily perform functions of dehumidifying the air in the first path 11 and humidifying the air in the second path 12.

Figure 5:
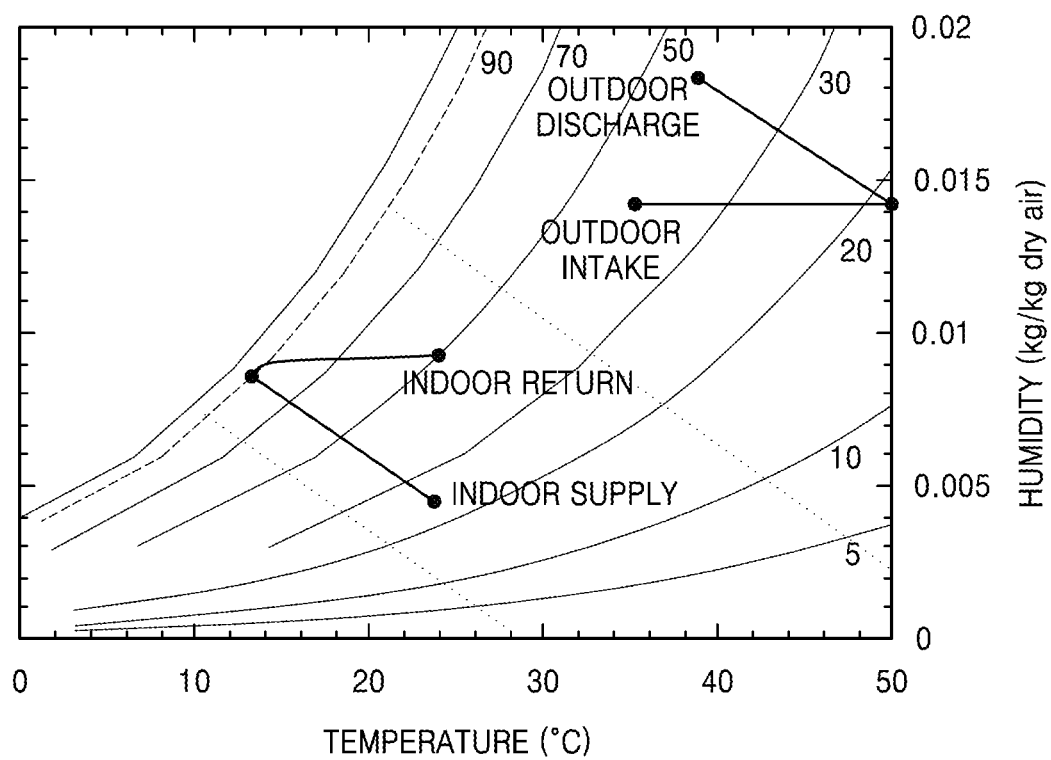
FIG. 5 is a graph of changes in the temperature and humidity of air according to the dehumidification mode of FIG. 4.

FIG. 5 is a graph (psychrometrics chart) of changes in the temperature and humidity of air according to the dehumidification mode of FIG. 4. FIG. 5 illustrates all changes in the temperature and humidity of indoor return air, air supplied to the indoor, air drawn from the outdoor, and air discharged to the outdoor.

The indoor return air is cooled by passing through the evaporator 41 and then dehumidified by the heat and mass exchanger 20, thereby being supplied to the indoor. The outdoor intake air drawn from the outdoor is heated by passing through the condenser 42 and humidified by the heat and mass exchanger 20, thereby being discharged to the outdoor.

As the evaporator 41 is arranged at the upstream side of the heat and mass exchanger 20, an amount of moisture absorbed by the heat and mass exchanger 20 from the air of the first path 11 (dehumidification amount) may be increased. Accordingly, as the dehumidified and cooled air is supplied to the indoor, a fresh indoor environment may be established.

Figure 6:
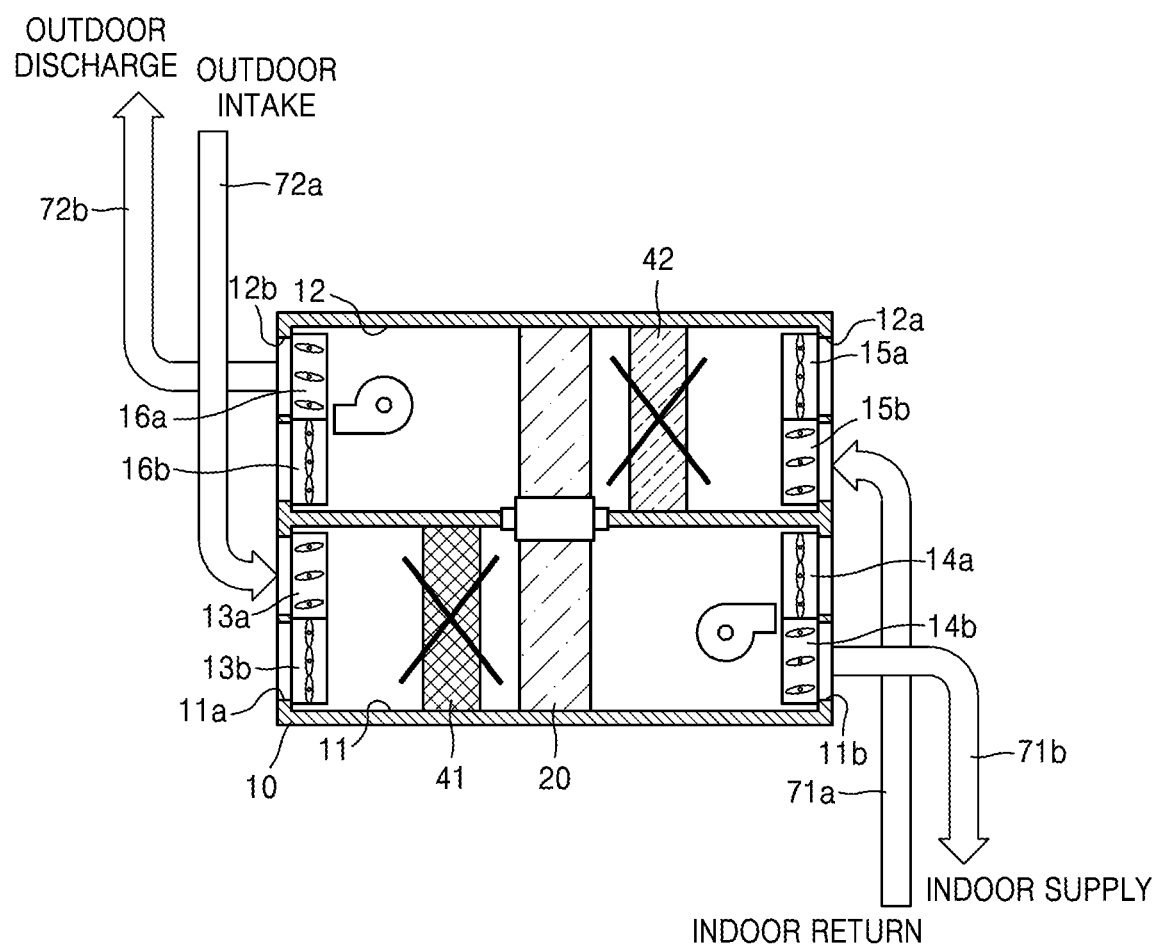
FIG. 6 illustrates an example in which the air conditioning system of FIG. 1 performs an energy recovery ventilation mode.

FIG. 6 illustrates an example in which the air conditioning system of FIG. 1 performs an energy recovery ventilation mode. In FIG. 6, some elements of FIG. 1 are not illustrated for simplicity's sake.

In FIG. 6, the outdoor intake path 72a for transferring the air drawn from the outdoor to the first path 11 is connected to the inlet damper 13a arranged at the entrance 11a of the first path 11, and the indoor supply path 71b for transferring the air of the first path 11 to the indoor is connected to the outlet damper 14b arranged at the exit 11b of the first path 11.

In the energy recovery ventilation mode of FIG. 6, the operations of the evaporator 41 and the condenser 42 are stopped. In other words, in the energy recovery ventilation mode, a heat exchange operation is not performed between the evaporator 41 and the condenser 42.

The air drawn from the outdoor is transferred through the outdoor intake path 72a to the first path 11. When the outdoor intake air drawn into the first path 11 passes through the heat and mass exchanger 20, the heat and mass exchanger 20 absorbs enthalpy (sensible heat and latent heat) from the outdoor intake air. The air that lost energy while passing through the heat and mass exchanger 20 is supplied to the indoor through the indoor supply path 71b (indoor supply air).

The indoor return path 71a for transferring the indoor return air to the second path 12 is connected to the inlet damper 15b arranged at the entrance 12a of the second path 12, and the outdoor discharge path 72b for discharging the air to the outdoor is connected to the outlet damper 16a arranged at the exit 12b of the second path 12.

The indoor return air drawn into the second path 12 through the indoor return path 71a (indoor return air) is heated by passing through the heat and mass exchanger 20 and discharged to the outdoor through the outdoor discharge path 72b (outdoor discharge).

In the above description, heat and moisture of the air is decreased from the first path 11 and the air is heated and humidified in the second path 12, which corresponds to the operation performed in the summer season. The direction of heat and mass transfer may be reversed according to a season. In other words, in the winter season, heat may be removed from the air in the second path 12 and transferred to the air in the first path 11.

The indoor return path 71a or the outdoor intake path 72a is connected to the other inlet dampers 13b and 15a of FIG. 6, and the outdoor discharge path 72b or the indoor supply path 71b is connected to the other outlet dampers 14a and 16b. However, the other inlet dampers 13b and 15a and the other outlet dampers 14a and 16b are operated at a closing position and thus a flow of air with respect to the paths is interrupted. In FIG. 6, illustration of paths in which a flow of air is interrupted is omitted in order to mainly describe an actual flow of air.

Figure 7:
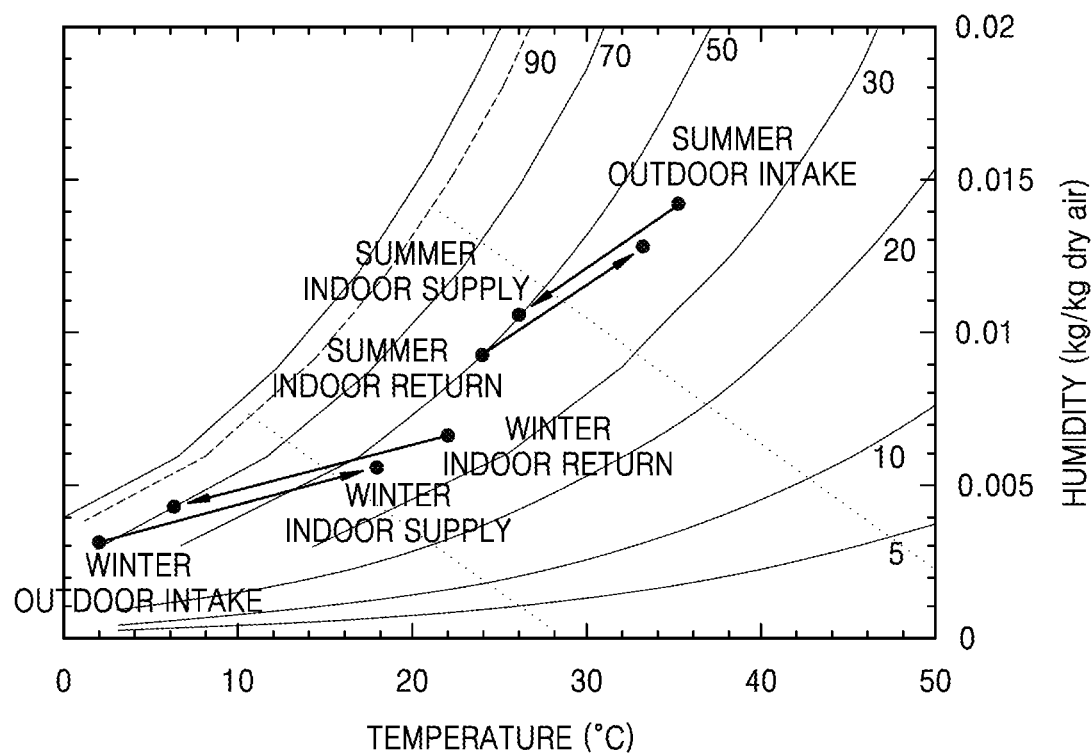
FIG. 7 is a graph of changes in the temperature and humidity of air according to the energy recovery ventilation mode of FIG. 6.

FIG. 7 is a graph (psychrometrics chart) of changes in the temperature and humidity of air according to the energy recovery ventilation mode of FIG. 6. FIG. 7 illustrates all changes in the temperature and humidity of the indoor return air, the air supplied to the indoor, the air drawn from the outdoor, and the air discharged to the outdoor for each of the winter season and the summer season.

To perform the energy recovery ventilation mode of FIGS. 6 and 7, the air conditioning system rotates the heat and mass exchanger 20 at a speed (high speed) corresponding to a speed equal to or greater than a preset high speed value. For example, when the heat and mass exchanger 20 rotates at a high speed of about 2 rpm or higher, the heat and mass exchanger 20 performs a function of the enthalpy exchanger to exchange heat and moisture between the indoor discharge air and the outdoor intake air.

In the case of the summer season, the outdoor intake air drawn from the outdoor to the indoor has heat of a relatively high temperature. When the indoor return air drawn into the first path 11 in the indoor passes through the heat and mass exchanger 20, the indoor return air receives heat from the heat and mass exchanger 20 so that the temperature of the indoor return air is increased, and then, the indoor return air is discharged to the outdoor. The heat and mass exchanger 20 absorbs heat and moisture from the outdoor intake air passing through the first path 11. Accordingly, the air supplied to the indoor from the first path 11 is supplied in a state of being cooled at a temperature lower than that of the air drawn from the outdoor.

In the case of the winter season, the indoor return air discharged from the indoor to the outdoor has heat of a relatively high temperature. The heat and mass exchanger 20 absorbs heat and moisture from the indoor return air passing through the second path 12. Also, when the air drawn from the outdoor into the first path 11 passes through the heat and mass exchanger 20, the air retrieves heat and moisture from the heat and mass exchanger 20 so that the temperature of the air is increased. Then, the air is supplied to the indoor.

In the above-described energy recovery ventilation mode, during a ventilation operation of discharging the indoor return air to the outdoor and drawing the outdoor intake air into the indoor, in the winter season, the indoor return air may be discharged to the outdoor after the heat and moisture of the indoor return air is removed and, in the summer season, the heat and moisture of the outdoor intake air is removed so that cooler and drier air is supplied to the indoor. Thus, it is efficient in terms of energy.

Figure 8:
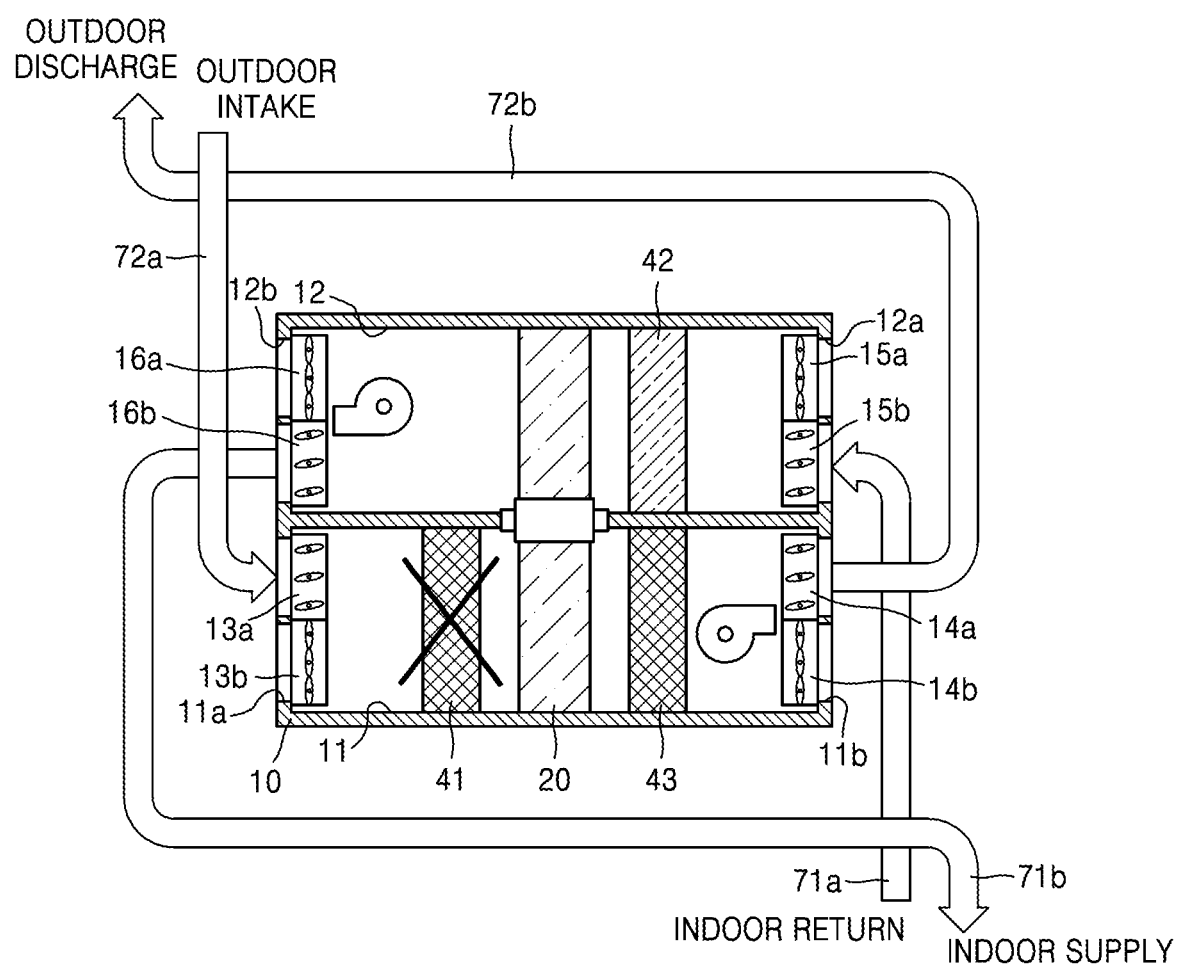
FIG. 8 illustrates an example in which an air conditioning system according to another embodiment performs a humidification mode.

FIG. 8 illustrates an example in which an air conditioning system according to another embodiment performs a humidification mode. In FIG. 8, illustrated of some elements are omitted for simplicity's sake.

The structure of the air conditioning system of FIG. 8 is substantially the same as that of the air conditioning system of FIG. 1, except that a downstream evaporator 43 is positioned at the downstream side of the heat and mass exchanger 20 in the first path 11, that is, at a position close to the exit 11b of the first path 11.

In a humidification mode of the air conditioning system of FIG. 8, the operation of the evaporator 41 is stopped. In other words, the heat exchange operation between the evaporator 41 and the air is not performed in the humidification mode.

In FIG. 8, the outdoor intake path 72a for transferring the air drawn from the outdoor to the first path 11 is connected to the inlet damper 13a arranged at the entrance 11a of the first path 11, and the outdoor discharge path 72b for discharging the air of the first path 11 to the outdoor is connected to the outlet damper 14a arranged at the exit 11b of the first path 11.

The indoor return path 71a for transferring the indoor return air to the second path 12 is connected to the inlet damper 15b arranged at the entrance 12a of the second path 12, and the indoor supply path 71b for supplying air to the indoor is connected to the outlet damper 16b arranged at the exit 12b of the second path 12.

The indoor return air drawn into the second path 12 through the indoor return path 71a (indoor return air) passes through the condenser 42 so that the temperature of the indoor return air is increased, and then, the indoor return air is humidified by passing through the heat and mass exchanger 20 and supplied to the indoor through the indoor supply path 71b (indoor supply).

The air drawn from the outdoor through the outdoor intake path 72a is transferred to the first path 11. When the outdoor intake air drawn into the first path 11 passes through the heat and mass exchanger 20, the outdoor intake air is dehumidified. The air dehumidified by passing through the heat and mass exchanger 20 is cooled by passing through the downstream evaporator 43, and then, the cooled air is discharged to the outdoor through the outdoor discharge path 72b.

The indoor return path 71a or the outdoor intake path 72a is connected to the other inlet dampers 13b and 15a of FIG. 8, and the outdoor discharge path 72b or the indoor supply path 71b is connected to the other outlet dampers 14b and 16a. However, the other inlet dampers 13b and 15a and the other outlet dampers 14b and 16a are operated at a closing position and thus a flow of air with respect to the paths is interrupted. In FIG. 8, illustration of paths in which a flow of air is interrupted is omitted to mainly describe an actual flow of air.

In the humidification mode of FIG. 8, a dehumidification operation is performed on the air passing through the first path 11 and a humidification operation is performed on the air passing through the second path 12. During performing the humidification mode, the heat and mass exchanger 20 performs functions of dehumidifying the air in the first path 11 and humidifying the air in the second path 12.

To perform the humidification mode of FIG. 8, the air conditioning system rotates the heat and mass exchanger 20 at a speed (low speed) corresponding to a speed equal to or less than a preset low speed value. For example, when the heat and mass exchanger 20 rotates at a low speed in a range of about 0.1 to 1 rpm, the heat and mass exchanger 20 may easily perform functions of dehumidifying the air in the first path 11 and humidifying the air in the second path 12.

Figure 9:
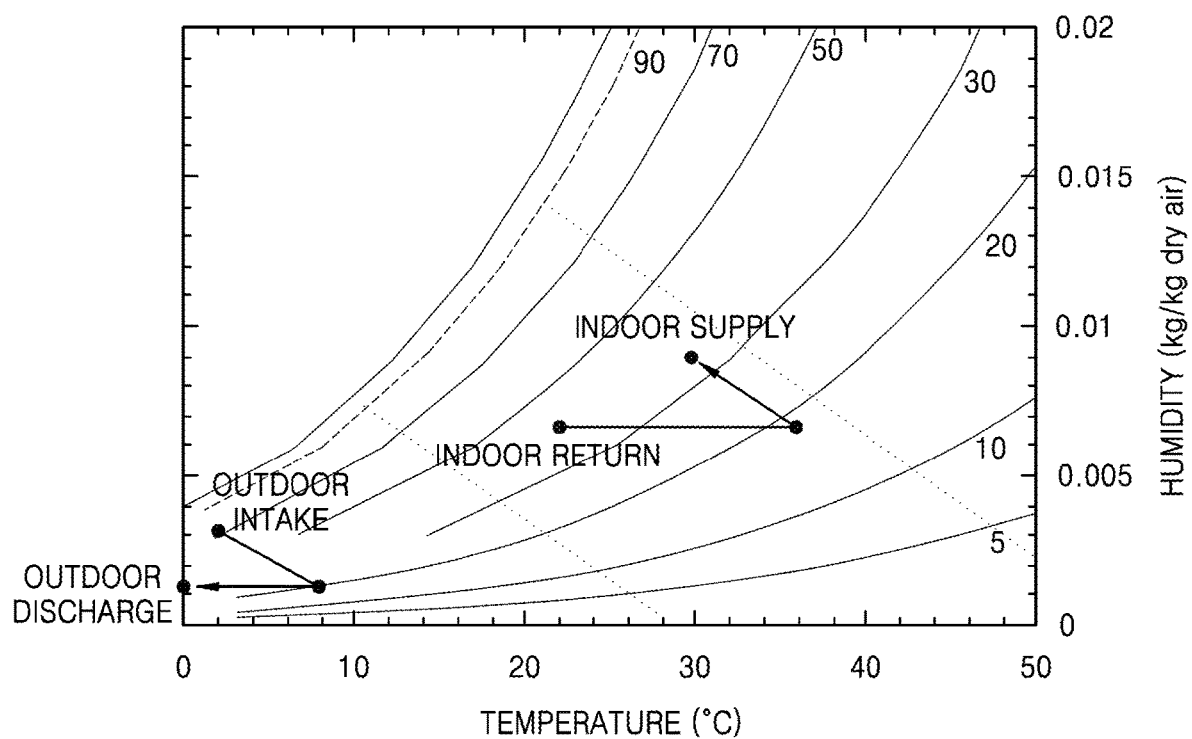
FIG. 9 is a graph of changes in the temperature and humidity of air according to the humidification mode of FIG. 8.

FIG. 9 is a graph (psychrometrics chart) of changes in the temperature and humidity of air according to the humidification mode of FIG. 8. FIG. 9 illustrates all changes in the temperature and humidity of the indoor return air, the air supplied to the indoor, the air drawn from the outdoor, and the air discharged to the outdoor.

The indoor return air is heated by passing through the condenser 42, humidified by the heat and mass exchanger 20, and then supplied to the indoor. The outdoor intake air drawn from the outdoor is humidified by the heat and mass exchanger 20, cooled by the downstream evaporator 43, and discharged to the outdoor.

When the downstream evaporator 43 is arranged at the downstream side of the heat and mass exchanger 20, the heat and mass exchanger 20 may first increase the temperature of the air and decrease humidity of the air. Accordingly, since the air having an increased temperature and a decreased humidity passes through the downstream evaporator 43, generation of frost on the downstream evaporator 43 may be prevented and simultaneously an overall efficiency of the heat pump may be improved.

Figure 10:
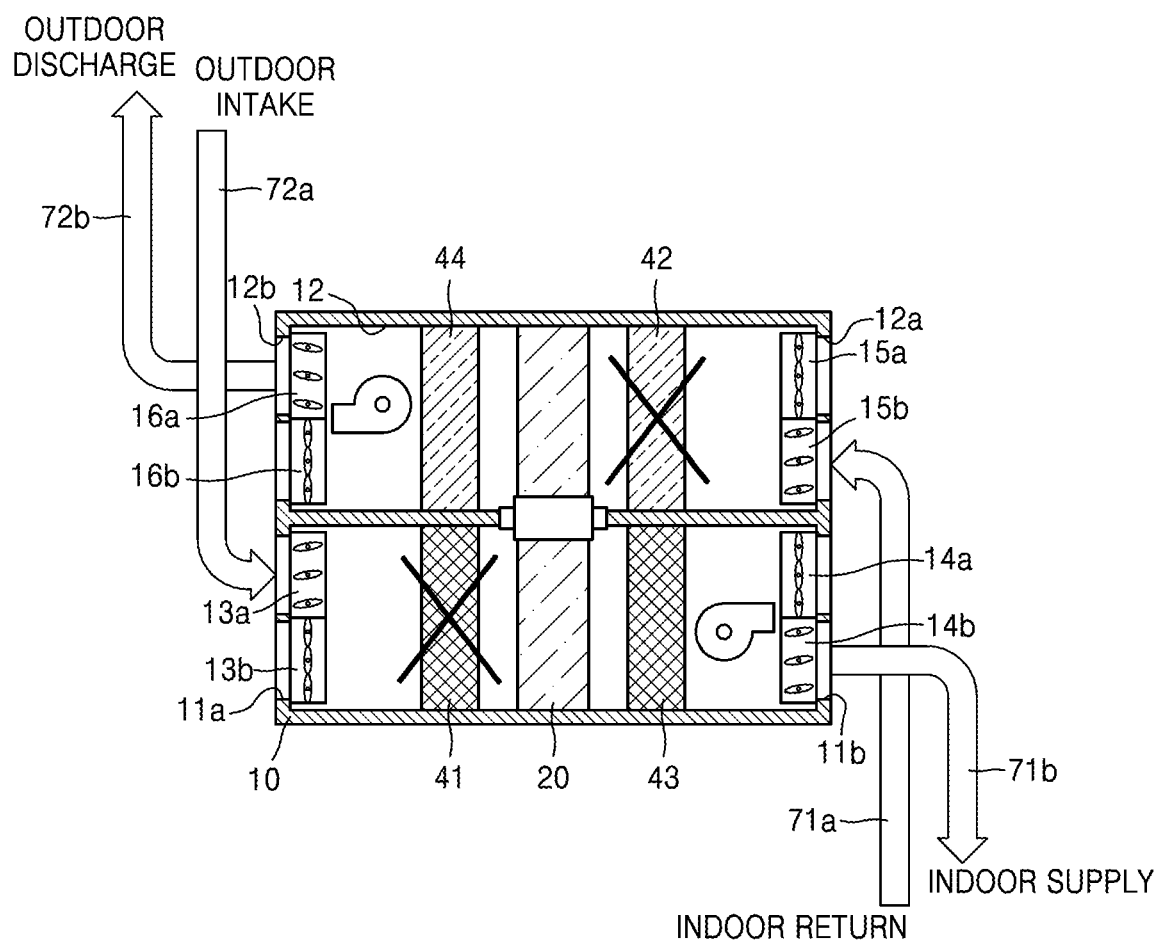
FIG. 10 illustrates an example in which an air conditioning system according to another embodiment performs a ventilation cooling mode.

FIG. 10 illustrates an example in which an air conditioning system according to another embodiment performs a ventilation cooling mode. In FIG. 10, illustration of some elements is omitted for simplicity's sake.

The structure of the air conditioning system of FIG. 10 is substantially the same as that of the air conditioning system of FIG. 8, except that a downstream condenser 44 is additionally positioned at the downstream side of the heat and mass exchanger 20 in the second path 12, that is, at a position close to the exit 12b of the second path 12.

In the ventilation cooling mode of the air conditioning system of FIG. 10, the operations of the evaporator 41 and the condenser 42 are stopped and the downstream evaporator 43 and the downstream condenser 44 are operated. In other words, in the ventilation cooling mode, the evaporator 41 and the condenser 42 do not perform a heat exchange operation with the air.

To perform the ventilation cooling mode of FIG. 10, the air conditioning system rotates the heat and mass exchanger 20 at a speed (high speed) corresponding to a speed equal to or greater than a preset high speed value. For example, when the heat and mass exchanger 20 rotates at a high speed of about 2 rpm or more, the heat and mass exchanger 20 performs a function of the enthalpy exchanger to exchange heat and moisture between the indoor discharge air and the outdoor intake air.

In FIG. 10, the outdoor intake path 72a for transferring the air drawn from the outdoor to the first path 11 is connected to the inlet damper 13a arranged at the entrance 11a of the first path 11, and the indoor supply path 71b for supplying the air of the first path 11 to the indoor is connected to the outlet damper 14b arranges at the exit 11b of the first path 11.

The air drawn from the outdoor through the outdoor intake path 72a is transferred to the first path 11. When the outdoor intake air drawn into the first path 11 passes through the heat and mass exchanger 20, the heat and mass exchanger 20 absorbs enthalpy (sensible heat and latent heat) from the outdoor intake air. The air that lost heat while passing through the heat and mass exchanger 20 is cooled by passing through the downstream evaporator 43 and then supplied to the indoor through the indoor supply path 71b (indoor supply air).

The indoor intake path 71a for transferring the indoor return air to the second path 12 is connected to the inlet damper 15b arranged at the entrance 12a of the second path 12, and the outdoor discharge path 72b for discharging the air to the outdoor is connected to the outlet damper 16a arranged at the exit 12b of the second path 12.

The indoor return air drawn into the second path 12 through the indoor return path 71a (indoor return air) is heated and humidified by passing through the heat and mass exchanger 20, with the heat and moisture that the heat and mass exchanger 20 collected from the air of the first path 11, is further heated by the downstream condenser 44, and is discharged to the outdoor through the outdoor discharge path 72b (outdoor discharge).

The indoor return path 71a or the outdoor intake path 72a is connected to the other inlet dampers 13b and 15a of FIG. 6, and the outdoor discharge path 72b or the indoor supply path 71b is connected to the other outlet dampers 14a and 16b. However, the other inlet dampers 13b and 15a and the other outlet dampers 14a and 16b are operated at a closing position and thus a flow of air with respect to the paths is interrupted. In FIG. 10, illustration of paths in which a flow of air is interrupted is omitted in order to mainly describe an actual flow of air.

Figure 11:
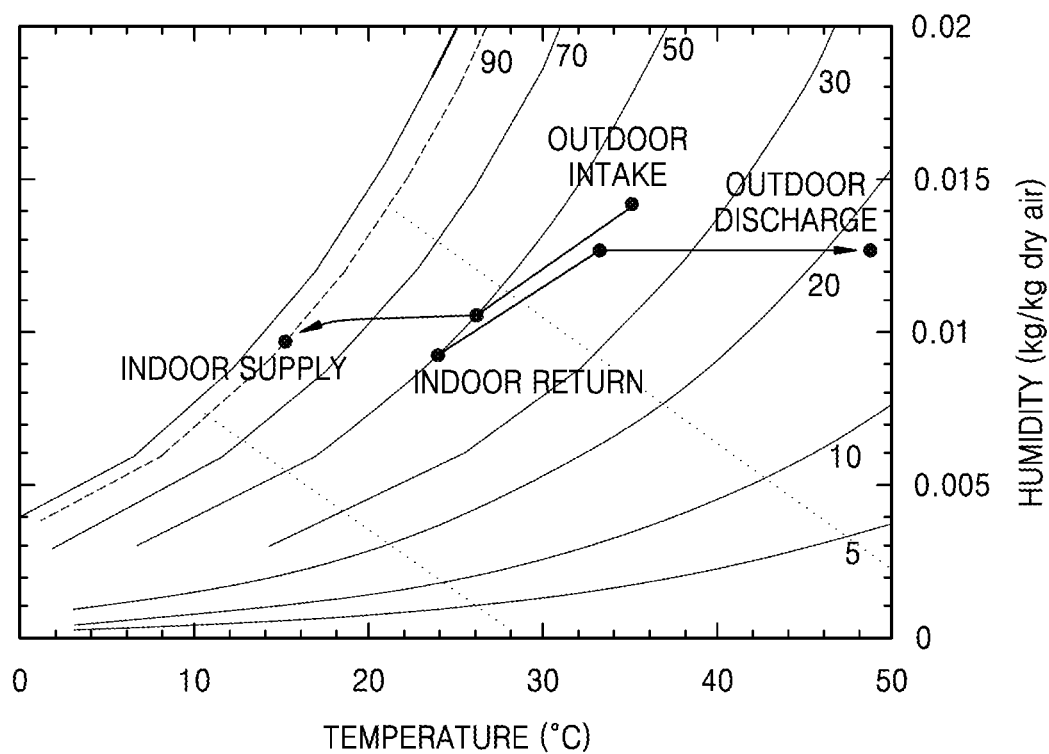
FIG. 11 is a graph of changes in the temperature and humidity of air according to the ventilation cooling mode of FIG. 10.

FIG. 11 is a graph (psychrometrics chart) of changes in the temperature and humidity of air according to the ventilation cooling mode of FIG. 10. FIG. 11 illustrates all changes in the temperature and humidity of the indoor return air, the air supplied to the indoor, the air drawn from the outdoor, and the air discharged to the outdoor.

When the outdoor intake air drawn from the outdoor into the first path 11 passes through the heat and mass exchanger 20, the heat and mass exchanger 20 absorbs enthalpy (sensible heat and latent heat) from the outdoor intake air. The air that lost heat while passing through the heat and mass exchanger 20 is further cooled by the downstream evaporator 43 and supplied to the indoor.

When the indoor return air drawn into the second path 12 passes through the heat and mass exchanger 20, the indoor return air is heated and humidified with the heat and moisture that the heat and mass exchanger 20 collected from the air of the first path 11. The air heated by passing through the heat and mass exchanger 20 is further heated by the downstream condenser 44 and discharged to the outdoor.

In the above-described ventilation cooling mode, since heat is collected from the air drawn from the outdoor into the first path 11 and the indoor return air drawn from the indoor into the second path 12 is discharged to the outdoor, the cooling operation of supplying cooled air to the indoor may be performed together while the ventilation operation of drawing the outdoor intake air into the indoor is performed.

Figure 12:
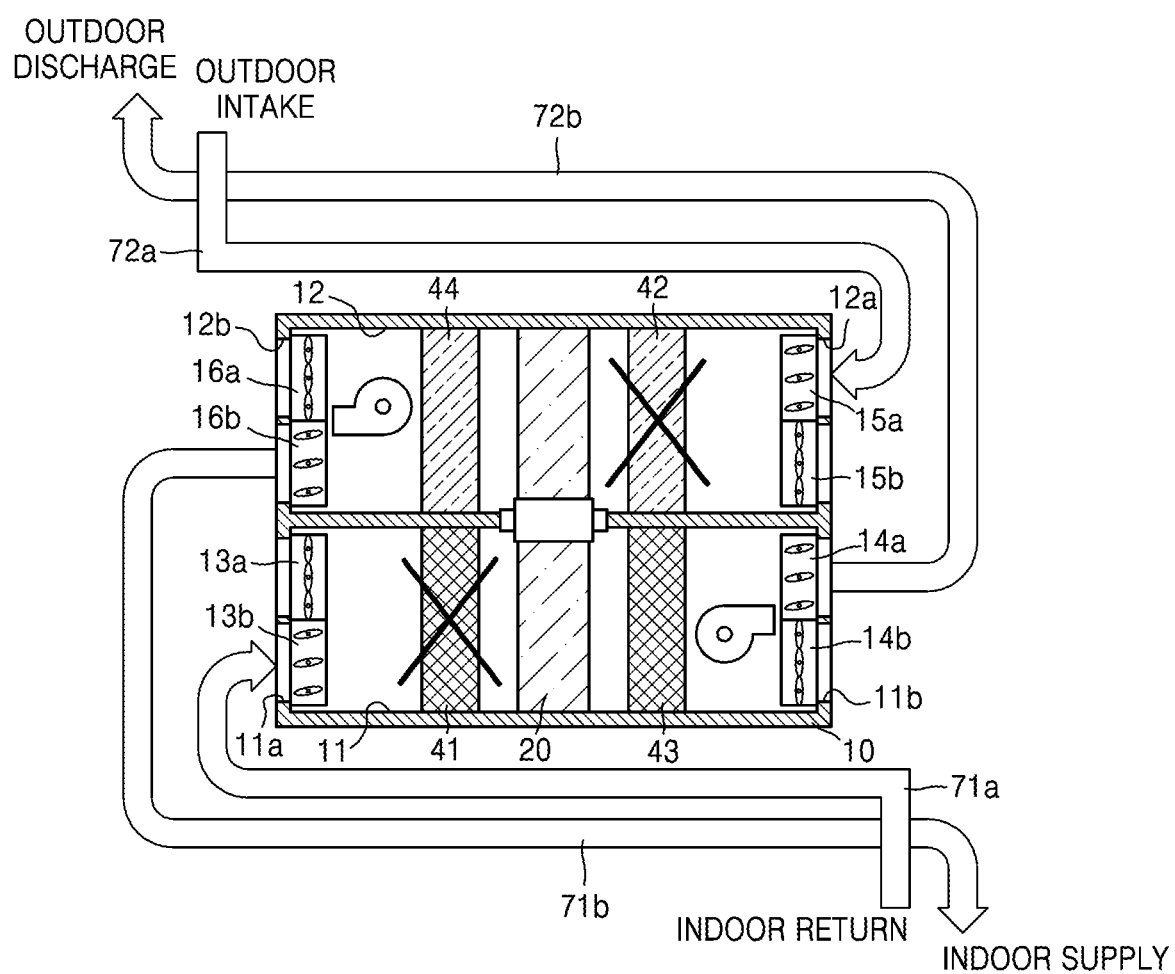
FIG. 12 illustrates an example in which the air conditioning system of FIG. 10 performs a ventilation heating mode.

FIG. 12 illustrates an example in which the air conditioning system of FIG. 10 performs a ventilation heating mode. In FIG. 12, illustration of some elements is omitted for simplicity's sake.

In the ventilation heating mode of the air conditioning system of FIG. 12, the operations of the evaporator 41 and the condenser 42 are stopped and the downstream evaporator 43 and the downstream condenser 44 are operated. In other words, in the ventilation heating mode, the evaporator 41 and the condenser 42 do not perform a heat exchange operation with the air.

To perform the ventilation heating mode of FIG. 12, the air conditioning system rotates the heat and mass exchanger 20 at a speed (high speed) corresponding to a speed equal to or greater than a preset high speed value. For example, when the heat and mass exchanger 20 rotates at a high speed of about 2 rpm or more, the heat and mass exchanger 20 performs a function of the enthalpy exchanger to exchange heat and moisture between the indoor discharge air and the outdoor intake air.

In FIG. 12, the indoor return path 71a for supplying the indoor return air to the first path 11 is connected to the inlet damper 13b arranged at the entrance 11a of the first path 11, and the outdoor discharge path 72b for discharging the air of the first path 11 to the outdoor is connected to the outlet damper 14a arranged at the exit 11b of the first path 11.

When the indoor return air drawn into the first path 11 through the indoor return path 71a passes through the heat and mass exchanger 20, the heat and mass exchanger 20 collects enthalpy (sensible heat and latent heat) from the indoor return air. The air that lost heat while passing through the heat and mass exchanger 20 is further cooled by passing through the downstream evaporator 43 and discharged to the outdoor through the outdoor discharge path 72b.

The outdoor intake path 72a for transferring the indoor return air to the second path 12 is connected to the inlet damper 15a arranged at the entrance 12a of the second path 12, and the indoor supply path 71b for supplying the air to the indoor is connected to the outlet damper 16b arranged at the exit 12b of the second path 12.

While the outdoor intake air drawn into the second path 12 through the outdoor intake path 72a passes through the heat and mass exchanger 20, the outdoor intake air is heated with the heat that the heat and mass exchanger 20 collected from the air of the first path 11 so that the temperature and humidity of the outdoor intake air are increased. The air heated by the heat and mass exchanger 20 is further heated by the downstream condenser 44 and supplied to the indoor through the indoor supply path 71b.

The indoor return path 71a or the outdoor intake path 72a is connected to the other inlet dampers 13a and 15b of FIG. 12, and the outdoor discharge path 72b or the indoor supply path 71b is connected to the other outlet dampers 14b and 16a. However, the other inlet dampers 13a and 15b and the other outlet dampers 14b and 16a are operated at a closing position and thus a flow of air with respect to the paths is interrupted. In FIG. 12, illustration of paths in which a flow of air is interrupted is omitted to mainly describe an actual flow of air.

Figure 13:
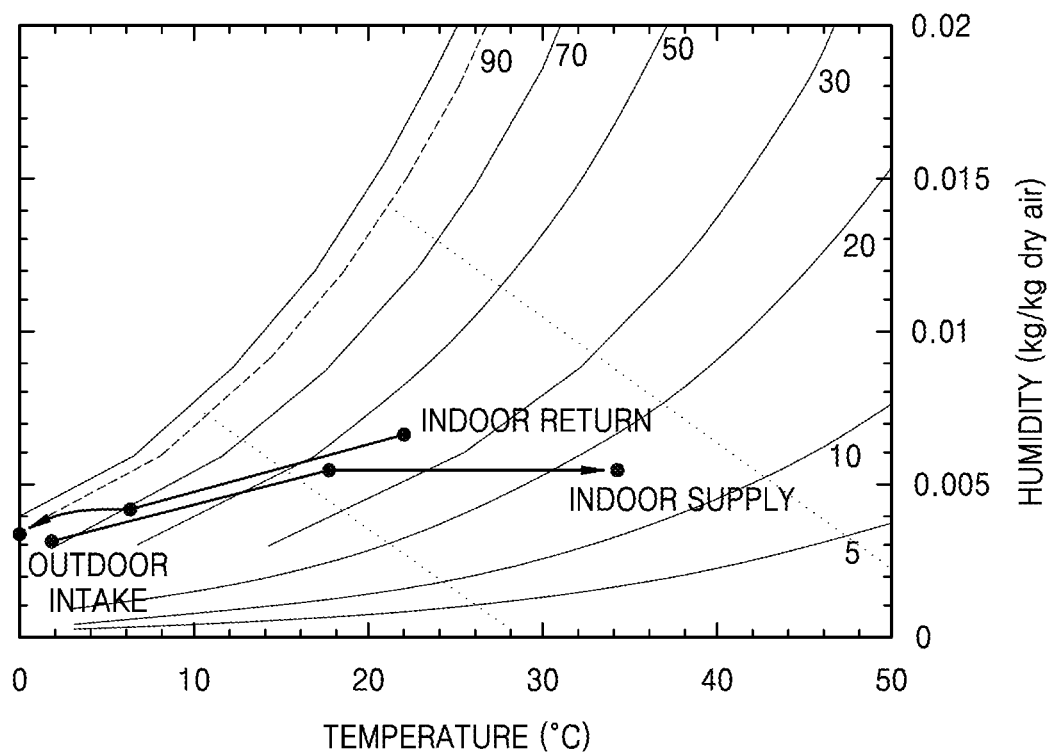
FIG. 13 is a graph of changes in the temperature and humidity of air according to the ventilation heating mode of FIG. 12.

FIG. 13 is a graph (psychrometrics chart) of changes in the temperature and humidity of air according to the ventilation heating mode of FIG. 12. FIG. 13 illustrates all changes in the temperature and humidity of the indoor return air, the air supplied to the indoor, the air drawn from the outdoor, and the air discharged to the outdoor.

When the indoor return air drawn from the indoor into the first path 11 passes through the heat and mass exchanger 20, the heat and mass exchanger 20 collects enthalpy (sensible heat and latent heat) from the indoor return air. The air that lost heat while passing through the heat and mass exchanger 20 is further cooled by the downstream evaporator 43 and discharged to the outdoor.

When the outdoor intake air drawn from the outdoor into the second path 12 passes through the heat and mass exchanger 20, the outdoor intake air is heated with the heat that the heat and mass exchanger 20 collected from the air of the first path 11. The air heated while passing through the heat and mass exchanger 20 is further heated by the downstream condenser 44 and supplied to the indoor.

In the above-described ventilation heating mode, since heat is collected from the air drawn from the indoor into the first path 11 and then the outdoor intake air drawn from the outdoor into the second path 12 is heated and supplied to the indoor, the heating operation of supplying heated air to the indoor may be performed together while the ventilation operation of drawing the outdoor intake air into the indoor is performed.

Figure 14:
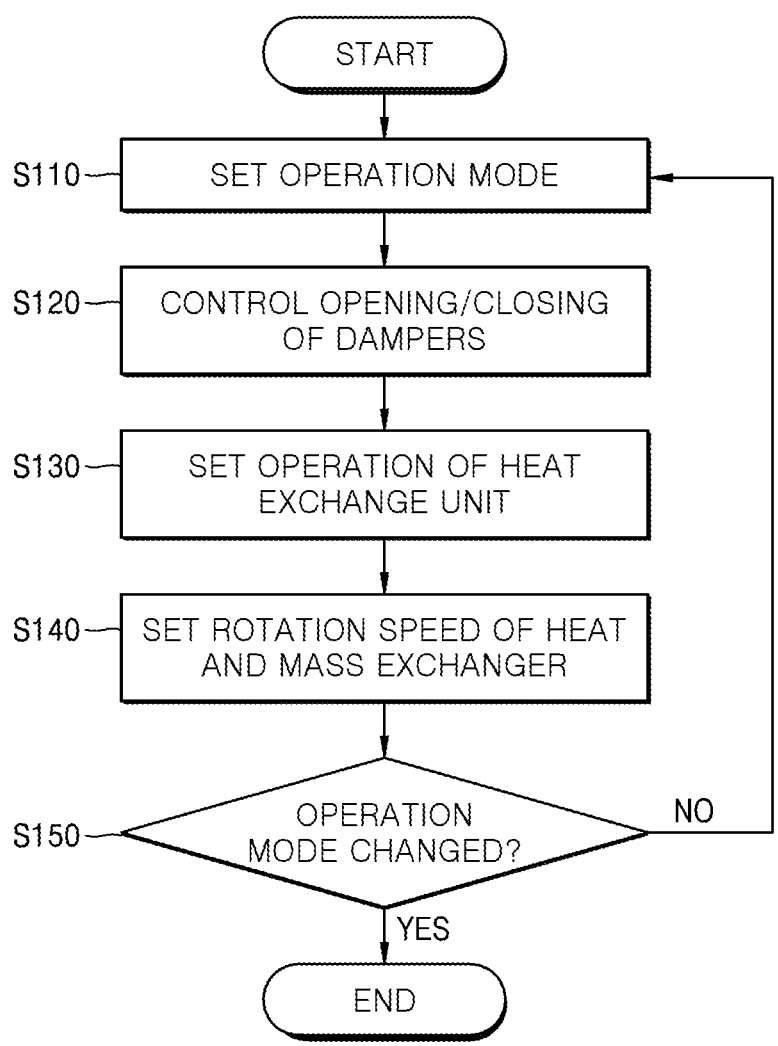
FIG. 14 is a flowchart schematically showing operations of a method of controlling an air conditioning system according to the embodiments of FIGS. 1 to 13.

FIG. 14 is a flowchart schematically showing operations of a method of controlling an air conditioning system according to the embodiments of FIGS. 1 to 13. The air conditioning systems according to the embodiments illustrated in FIGS. 1 to 13 may be controlled by the operations of the flowchart of FIG. 14.

The method of controlling an air conditioning system according to the present embodiment may include setting an operation mode to operate the air conditioning system (S110), controlling an opening/closing operation of a damper according to set operation modes (S120), setting an operation of a heat exchange unit according to the set operation modes (S130), and setting a rotation speed of a heat and mass exchanger according to the set operation modes (S140). If the operation mode is changed (S150), the operations from the setting of an operation mode (S110) to the setting of a rotation speed of a heat and mass exchanger (S140) may be repeatedly performed.

In the setting of an operation mode (S110), any one of the dehumidification mode, the humidification mode, the energy recovery ventilation mode, the ventilation cooling mode, and the ventilation heating mode may be selected. The selection of an operation mode may be automatically performed considering a state of temperature and humidity of an indoor space and a state of temperature and humidity of an outdoor space to be controlled by the air conditioning system, or may be performed according to a user's selection.

For example, when the humidity of an indoor space is high based on a humidity condition sensed by a sensor, the dehumidification mode may be set to be performed. When the humidity of the indoor space is low, the humidification mode may be set to be performed.

Also, when both of an energy recovery operation and a ventilation operation are needed based on a temperature condition and an air contamination condition sensed by the sensor, the energy recovery ventilation mode may be set to be performed.

Also, when a cooling operation or a heating operation is needed based on the temperature condition and the air pollution condition, the ventilation cooling mode in which both the cooling operation and the ventilation operation are performable, or a ventilation heating mode in which both the heating operation and the ventilation operation are performable, may be set to be performed.

In the controlling of an opening/closing operation of a damper according to set operation modes (S120) and the setting of an operation of a heat exchange unit according to the set operation modes (S130), controlling a damper opening/closing operation and setting an operation of the heat exchange unit are performed optimally according to the operation mode set in the setting of an operation mode (S110).

In other words, in the controlling of an opening/closing operation of a damper (S120), as illustrated in FIGS. 4, 6, 8, 10, and 12 according to the set operation modes, the dampers arranged at the entrances 11a and 12a and the exits 11b and 12b are controlled to be opened or closed to connect the entrances 11a and 12a and the exits 11b and 12b of the first path 11 and the second path 12 to any one of the outdoor discharge path 72b, the indoor supply path 71b, the outdoor intake path 72a, and the indoor return path 71a. When the damper is opened, the entrances 11a and 12a and the exits 11b and 12b may be completely opened or a flow amount may be changed by adjusting a degree of opening.

In the setting of an operation of a heat exchange unit (S130), as illustrated in FIGS. 4, 6, 8, 10, and 12 according to the set operation modes, each element of the heat pump may be operated or stopped.

In the setting of a rotation speed of a heat and mass exchanger (S140), a rotation speed to rotate the heat and mass exchanger is set suitable for the set operation modes. In other words, when the dehumidification mode or the humidification mode is set, the rotation speed of the heat and mass exchanger is set to a lower speed in a range of about 0.1 to 1 rpm. When the energy recovery ventilation mode is set, the rotation speed of the heat and mass exchanger is set to a high speed in a range of about 2 rpm or higher. When the ventilation cooling mode or the ventilation heating mode is set, the rotation speed of the heat and mass exchanger is set to a high speed equal to or greater than about 2 rpm.

In the related art, a plurality of elements such as a desiccant wheel and a enthalpy exchanger are needed in a combination in order to implement various operation modes (operating modes). However, according to the above-described air conditioning system, air conditioning operation modes (operating mode) of various functions may be implemented by using a reduced number of elements.

The heat and mass exchanger may selectively perform a function of the desiccant wheel or a function of the enthalpy exchanger by changing the rotation speed of the heat and mass exchanger including a hygroscopic material for absorbing moisture and rotatably arranged across the paths. Furthermore, various operation modes (operating mode) such as the dehumidification mode, the humidification mode, the energy recovery ventilation mode, the ventilation cooling mode, and the ventilation heating mode may be selectively performed by controlling the dampers, which opens or closes the entrances and exits of the paths linked to the rotation speed of the heat and mass exchanger, and simultaneously using the heat exchange unit arranged at at least one of the paths.

As described above, according to the above-described air conditioning system and the controlling method thereof, both functions of the desiccant wheel and the enthalpy exchanger may be performed by changing the rotation speed of the heat and mass exchanger.

According to the above-described air conditioning system and the controlling method thereof, various operation modes such as the dehumidification mode, the humidification mode, the cooling mode, the heating mode, and the energy recovery ventilation mode may be multiply selected and performed by using the heat exchange operation by the heat exchange unit, controlling the opening or closing of the entrances and exits of the paths by using the dampers, and changing the rotation speed of the heat and mass exchanger.

In addition, in the energy recovery ventilation mode performed by the air conditioning system and the controlling method thereof, while a ventilation operation of discharging the indoor return air to the outdoor and drawing the outdoor intake air into the indoor is performed, in the winter season, heat of the indoor return air is collected again so that the indoor return air may be discharged to the outdoor and, in the summer season, heat of the outdoor intake air is collected so that cooled air may be supplied to the indoor. Thus, it is efficient in terms of energy.

In addition, according to the air conditioning system and the controlling method thereof, in the winter season, the dehumidification mode may be formed with the energy recovery ventilation mode and, in the summer season, the humidification mode may be performed. Thus, the user's inconvenience to separately purchase and manage a dehumidifier and a humidifier may be addressed.

In addition, according to the air conditioning system and the controlling method thereof, in the humidification mode, there is no need to install a water container to implement a humidification function. Thus, there is no concern about propagation of germs and the inconvenience of managing the water container of a humidifier may be removed.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An air conditioner, comprising:
   a casing including a plurality of paths through which air passes;
   a plurality of dampers arranged at an entrance and an exit of each of the plurality of paths;
   a heat and mass exchanger including a hygroscopic material, arranged across the plurality of paths, and configured to be driven to rotate with respect to the casing;
   a heat exchanger having a heat transfer medium flowing inside the heat exchanger, and arranged on at least one path among the plurality of paths, the heat exchanger comprising:
      an upstream evaporator arranged at an upstream side of the heat and mass exchanger in a first path among the plurality of paths; and
      a condenser arranged at the upstream side of the heat and mass exchanger in a second path among the plurality of paths;
      a downstream evaporator arranged at a downstream side of the heat and mass exchanger in the first path;
      a downstream condenser arranged at the downstream side of the heat and mass exchanger in the second path; and
   a controller configured to:
      open and close the entrance and the exit by applying a first control signal to the plurality of dampers;
      control a rotation speed of the heat and mass exchanger by applying a second control signal to the heat and mass exchanger; and
      selectively cause the air conditioner to perform
      dehumidification by supplying dehumidified air to an indoor by passing indoor return air through the first path and discharging humidified air to an outdoor by passing outdoor intake air through the second path, by controlling the rotation speed of the heat and mass exchanger to within a preset first speed range,
      humidification by discharging the dehumidified air to the outdoor by passing the outdoor intake air through the first path and supplying the humidified air to the indoor by passing the indoor return air through the second path, by controlling the rotation speed of the heat and mass exchanger to within the preset first speed range,
      energy recovery ventilation by recovering and transferring heat and moisture between the indoor return air and the outdoor intake air by the heat and mass exchanger, by passing the indoor return air through the second path to be discharged to the outdoor and passing the outdoor intake air through the first path to be supplied to the indoor, by controlling the rotation speed of the heat and mass exchanger to within a preset second speed range,
      ventilation cooling by discharging the indoor return air, which is heated by the heat and mass exchanger, to the outdoor by passing the indoor return air through the second path and supplying the outdoor intake air, which is cooled by the heat and mass exchanger, to the indoor by passing the outdoor intake air through the first path, by controlling the rotation speed of the heat and mass exchanger to within the preset second speed range, and
      ventilation heating by supplying the outdoor intake air, which is heated by the heat and mass exchanger, to the indoor by passing the outdoor intake air through the second path and discharging the indoor return air, which is cooled by the heat and mass exchanger, to the outdoor by passing the indoor return air through the first path, by controlling the rotation speed of the heat and mass exchanger to within the preset second speed range.

2. The air conditioner of claim 1, wherein the plurality of dampers comprise:
   a plurality of outlet dampers connecting exits of the first path among the plurality of paths and the second path among the plurality of paths to an outdoor discharge path or an indoor supply path, and
   a plurality of inlet dampers connecting entrances of the first path and the second path to an outdoor intake path or an indoor return path.

3. The air conditioner of claim 1, wherein the preset first speed range is 0.1 to 1 rpm, and the preset second speed range is 2 rpm or higher.

4. The air conditioner of claim 3, wherein the upstream evaporator and the condenser operate and the downstream evaporator and the downstream condenser do not operate during the dehumidification, the upstream evaporator and the downstream condenser do not operate and the condenser and the downstream evaporator operate during the humidification, the upstream evaporator, the condenser, the downstream evaporator, and the downstream condenser do not operate during the energy recovery ventilation, and the upstream evaporator and the condenser do not operate and the downstream evaporator and the downstream condenser operate during the ventilation cooling and the ventilation heating.

5. An air conditioner, comprising:
a casing including a plurality of paths through which air passes;
a plurality of dampers arranged at an entrance and an exit of each of the plurality of paths;
a heat and mass exchanger including a hygroscopic material, arranged across the plurality of paths, and configured to be driven to rotate with respect to the casing;
a heat exchanger having a heat transfer medium flowing inside the heat exchanger, and arranged on at least one path among the plurality of paths, the heat exchanger comprising:
an upstream evaporator arranged at an upstream side of the heat and mass exchanger in a first path among the plurality of paths; and
a condenser arranged at the upstream side of the heat and mass exchanger in a second path among the plurality of paths;
a downstream evaporator arranged at a downstream side of the heat and mass exchanger in the first path; and
a controller configured to open and close the entrance and the exit by applying a first control signal to the plurality of dampers, and control a rotation speed of the heat and mass exchanger by applying a second control signal to the heat and mass exchanger,
wherein the controller is further configured to selectively cause the air conditioner to perform dehumidification, humidification, energy recovery ventilation, ventilation cooling, and ventilation heating by controlling the rotation speed of the heat and mass exchanger, and
wherein the upstream evaporator and the condenser operate and the downstream evaporator and a downstream condenser do not operate during the dehumidification, the upstream evaporator and the downstream condenser do not operate and the condenser and the downstream evaporator operate during the humidification, the upstream evaporator, the condenser, the downstream evaporator, and the downstream condenser do not operate during the energy recovery ventilation, and the upstream evaporator and the condenser do not operate and the downstream evaporator and the downstream condenser operate during the ventilation cooling and the ventilation heating.

6. The air conditioner of claim 1, wherein the controller is further configured to perform the selective causing of the air conditioner to:
perform the dehumidification by controlling the rotation speed of the heat and mass exchanger to a first speed in the preset first speed range, and
perform the energy recovery ventilation by controlling the rotation speed of the heat and mass exchanger to a second speed in the preset second speed range.

7. The air conditioner of claim 6, wherein the preset first speed range is 0.1 to 1 rpm, and the preset second speed range is 2 rpm or higher.

8. The air conditioner of claim 6, wherein the upstream evaporator and the condenser operate during the dehumidification, and the upstream evaporator and the condenser do not operate during the energy recovery ventilation.

9. The air conditioner of claim 1, wherein the upstream evaporator and the condenser operate and the downstream evaporator does not operate during the dehumidification, the upstream evaporator does not operate and the condenser and the downstream evaporator operate during the humidification, and the upstream evaporator, the condenser, and the downstream evaporator do not operate during the energy recovery ventilation.

* * * * *